United States Patent [19]

Allegro

[11] 4,146,014

[45] Mar. 27, 1979

[54] INNER ROOF SOLAR SYSTEM

[76] Inventor: Joseph Allegro, 377 Ellamar Rd., West Palm Beach, Fla. 33405

[21] Appl. No.: 809,361

[22] Filed: Jun. 24, 1977

[51] Int. Cl.² ............................................... F24J 3/02
[52] U.S. Cl. ................................... 126/271; 237/1 A
[58] Field of Search ................ 126/270, 271; 237/1 A

[56] References Cited

U.S. PATENT DOCUMENTS

| 2,552,237 | 5/1951 | Trombe | 126/271 |
| 3,039,453 | 6/1962 | Andrassy | 126/271 |
| 4,000,850 | 1/1977 | Diggs | 126/271 |

FOREIGN PATENT DOCUMENTS

| 2309307 | 8/1974 | Fed. Rep. of Germany | 126/271 |
| A44022 | 7/1934 | France | 126/271 |

*Primary Examiner*—Kenneth W. Sprague
*Attorney, Agent, or Firm*—Laurence R. Brown

[57] ABSTRACT

The invention adds liquid solar heating to conventional house construction without altering the plans. Sections of moulded polyester resin embedding p.v.c. pipes connect together to provide a continuous liquid pathway which is hidden from view. The sections are artistically styled, obviating the unsightly appearance of present day solar equipped homes. The arrangement is very inexpensive, yet durable, and not subject to glass panels and its attendant breakage or the use of expensive copper tubing. The entire roof is a collector and different parts of the roof are exposed to the direct sunlight at all times of the day.

The solar sections actually replace the shingles, tile or other outer coating of the conventional roof for new construction. Hence, the solar section is integral with the house, making it more stormproof, yet workmen may walk over the roof.

7 Claims, 4 Drawing Figures

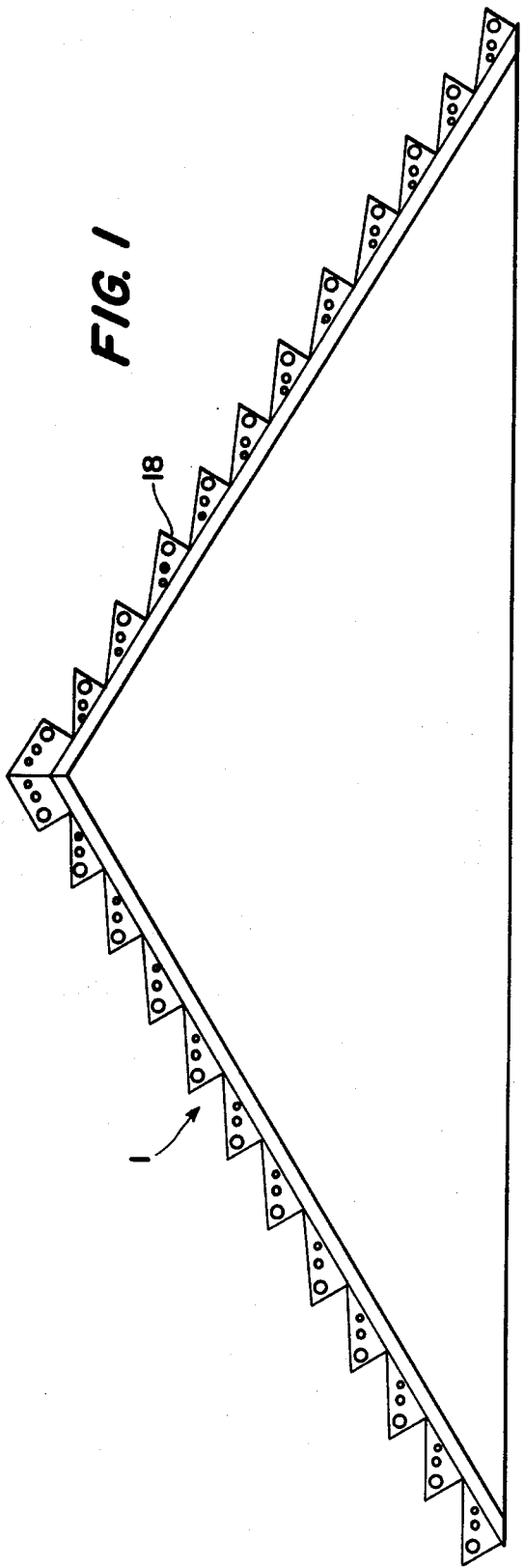
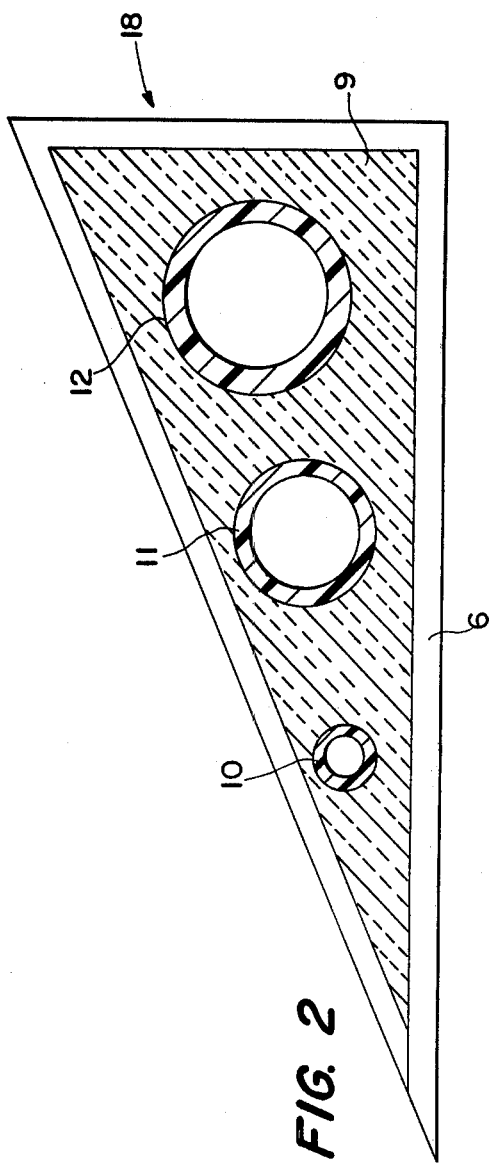

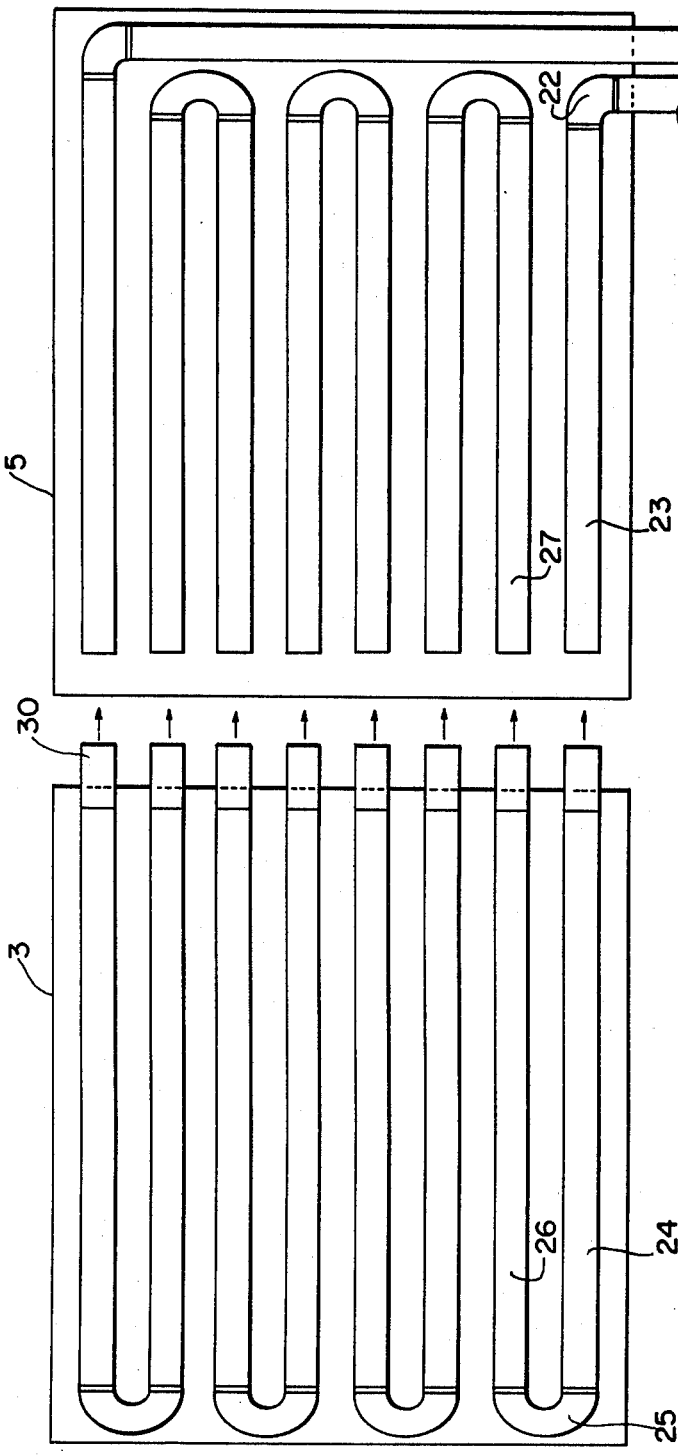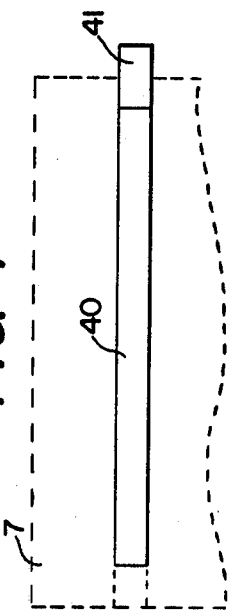

INNER ROOF SOLAR SYSTEM

PRIOR ART

U.S. Pat. No. 4,006,856 is typical of the panel type solar heated construction and does not teach a hidden liquid system. U.S. Pat. No. 4,020,989 shows structure incorporated into the original building plans which is not simple or inexpensive and also does not teach a hidden liquid system.

THE INVENTION

The present invention discloses solar heating construction, in modular interconnectible form, which may comprise the entire roof of a convention building. Casting of the sections in polyester resin moulds with embedded p.v.c. pipes insures reliable, inexpensive, easily incorporable structure which may serve as the entire exterior roof section.

The liquid tubing is entirely hidden — no glass panels are visible — and artistic sculpture may be designed into the mould to present a pleasant view, in contrast to today's unsightly shaped structures.

Basically, three moulds may provide for an entire house roof, i.e. outer end sections and an interconnecting middle section, cast to size can cover most roof sections. But, the present sections may be connected in larger numbers to fit the outline of the roof being covered — over existing shingles or new tar paper.

Graduated size p.v.c. pipes may be used to fit the contour of the moulded sections for artistic sculpture.

The heated water, via the holding tank heat exchanger (in the attic or elsewhere) can supply hot water for domestic use or even to warm the swimming pool or for air conditioning.

The use of glass bubble additives of fine and coarse size strengthen the polyester resins and permit use of lighter p.v.c. pipes.

The invention will be better understood from a reading of the following detailed description thereof, when taken in light of the accompanying drawings, wherein:

FIG. 1 is an end sectional view of a roof finished by a solar system in accordance with this invention;

FIG. 2 is an enlarged view of one step of FIG. 1;

FIG. 3 is a plan view of outer sections; and,

FIG. 4 is a partial view of intermediate section.

In FIG. 1, the completed solar exterior is shown at 1, being made up of several sections 3, 5, and 7 (FIGS. 3 and 4).

In FIG. 2, a single step of a section is shown enlarged to reveal the polyester insulation within outer surface 6 — which may include the coloring and/or abrasive for tread. Black or dark gray patterned or solid colors are preferred.

Embedded in resin insulation body 9 (which retains and transfers solar heat thereto) are three different sized p.v.c. pipes 10, 11, and 12. By way of example pipe 10 may have a diameter of ⅜", pipe 11 of ½", and pipe 12 of ¾". Also, I have used pipe of ½" diameter throughout all sections without graduation. The graduated pipes simply provide a different water volume for the artistic appearance shown. Obviously many varied structures or appearances may be incorporated into the mould for a variety of roof appearances.

To mould the sections 3, 5, and 7, I use three different moulds, all quite similar. The process is as follows:

1. Select the proper mould,
2. Locate the p.v.c. pipes in place, being held by their extending ends or extension fasteners or mounted on pins.
3. Polyester resin fluid is poured and allowed to set,
4. The mould is disassembled, and
5. The dried section is removed.

In FIG. 3, all p.v.c. pipes are shown of the same size. Arrow 20 indicates the flow path which follows inlet pipe 21, elbow 22, straight pipe 23 of section 5, interconnecting pipe 24 of section 3, elbow 25, straight pipe 26 and interconnecting pipe 27, etc. It is important to note that couplings 30 are glued (by p.v.c. glue) to the ends of the straight pipes, such as 24, of section 3 prior to moulding to receive the pipes of section 5 or intermediate section 7.

The location and pre-assembly of pipes for the various sections is obvious from the drawing. When the polyester resin is poured, the ends of pipes within the moulds are covered or closed to prevent penetration. Extender pipes are usually employed to protect the ends and maintain passageways to the edge of the sections.

In FIG. 4, an intermediate section 7 is shown with only pipe 40 being illustrated. Coupling 41 is located on pipe 40 so that this section may fit between outer sections 3 and 5.

The dimensions of sections 3, 5 and 7 are determined in accordance with roof size or standard sized modules are in inventory. For example, one facet of a roof may be covered by an intermediate and two outer sections. For larger roof facets, additional sections are employed because of strength and handling requirements, although cranes may be used for large sections. Obviously, other resins than polyester may be used i.e. polyethlene and other fillers may be substituted.

I prefer to use panels of 300 to 500 square feet each for convenience of moulding and handling, and fitting to most medium size houses.

What is claimed is:

1. A solar heat collector roof unit of a type adapted to have liquid circulated therethrough comprising, in combination, an exterior roof surface module having an exterior roof facing positioned outwardly to receive directly thereon solar heat energy and shaped to rest side by side and interconnect with adjacent similar modules on exterior roof surfaces, said modules constructed of an outer darkened surface material disposed to receive solar energy and positioned adjacent and integral with a non-metallic body of a resin material capable of receiving from the surface material and transmitting solar heat energy therethrough to liquid, and piping passageways embedded in the resin material to provide a liquid flow path surrounded by said resin material extending through the interior of the body whereby solar heated liquid may be circulated to transfer efficiently solar generated heat collected by the darkened surface material to a building underlying said roof.

2. The unit of claim 1 wherein said roof module is moulded with pipes of different material than said non-metallic body embedded therein.

3. The unit of claim 2 wherein the modules are shaped with triangular cross section with the exterior facing of a plurality of side-by-side modules being stepped to present as said facing two surfaces with said surface material.

4. The unit of claim 2 wherein the module includes adjacent pipes connected together at one set of ends accessible from the module and the opposite ends of said pipes being recessed within the module and sealed inside said body of material.

5. A module as defined in claim 1 wherein the said body of material comprises polyester resin and said piping comprises p.v.c. pipes embedded in said resin.

6. A module as defined in claim 1 including glass bubble additives in the polyester resin body.

7. A module as defined in claim 1 with said exterior facing colored dark gray.

* * * * *